(12) United States Patent
Brooks et al.

(10) Patent No.: US 6,893,407 B1
(45) Date of Patent: May 17, 2005

(54) COMMUNICATION METHOD AND APPARATUS

(75) Inventors: Anthony Brooks, Aarhus (DK); Christopher Sorensen, Grenaa (DK)

(73) Assignee: Personics A/S, Abyjoj (DK)

(*) Notice: Subject to any disclaimer, the term of this patent is extended or adjusted under 35 U.S.C. 154(b) by 0 days.

(21) Appl. No.: 09/565,924

(22) Filed: May 5, 2000

(51) Int. Cl.$^7$ .................. A61B 5/103; A61B 5/117
(52) U.S. Cl. .............. 600/595; 600/300; 600/545; 600/546
(58) Field of Search .............. 600/544–547, 600/300–301, 595; 345/156–168; 704/260, 704/270, 271, 277

(56) References Cited

U.S. PATENT DOCUMENTS

| | | | |
|---|---|---|---|
| 3,855,858 A | 12/1974 | Cushing | |
| 4,056,805 A | 11/1977 | Brady | |
| 4,408,192 A * | 10/1983 | Ward et al. | 340/407.1 |
| 4,682,159 A * | 7/1987 | Davison | 345/158 |
| 4,988,981 A * | 1/1991 | Zimmerman et al. | 345/158 |
| 5,024,235 A | 6/1991 | Ayers | |
| 5,036,858 A | 8/1991 | Carter et al. | |
| 5,047,952 A * | 9/1991 | Kramer et al. | 704/271 |
| 5,253,168 A * | 10/1993 | Berg | 600/301 |
| 5,260,869 A * | 11/1993 | Ferrier et al. | 600/595 |
| 5,343,871 A | 9/1994 | Bittman et al. | |
| 5,426,450 A * | 6/1995 | Drumm | 345/168 |
| 5,686,942 A * | 11/1997 | Ball | 345/158 |
| 5,692,517 A * | 12/1997 | Junker | 600/545 |
| 5,720,619 A | 2/1998 | Fisslinger | |
| 5,840,040 A * | 11/1998 | Altschuler et al. | 600/545 |
| 5,898,172 A | 4/1999 | Masui et al. | |
| 5,974,262 A * | 10/1999 | Fuller et al. | 710/18 |
| 6,011,991 A * | 1/2000 | Mardirossian | 600/544 |
| 6,347,290 B1 * | 2/2002 | Bartlett | 702/150 |

FOREIGN PATENT DOCUMENTS

| | | |
|---|---|---|
| DE | 19745508 | 10/1997 |
| DK | WO 01/86406 A1 * | 11/2001 |

OTHER PUBLICATIONS

"Bridging Cultures", Program from The 13th International Congres of WCPT, May 23-28, 1999, Yokohama, Japan.*
"Pushing the Limits" Congress Program and Abstract Book, 5th Scientific Vonfress, Sydney 2000 Paralympic Games, Oct. 11-13, 2000, Sydney, Australia.*
Letter from Clifford Madsen of the American Therapy Association.*
Program and Letter from the Integrative Medicine Expressive Therapies International Symposium, May 26-28, 1999.*

* cited by examiner

Primary Examiner—Robert L. Nasser
Assistant Examiner—Patricia Mallari
(74) Attorney, Agent, or Firm—Ladas & Parry LLP

(57) ABSTRACT

The present invention relates to a non-lingual communication method and apparatus, wherein a physical or physiological signal consciously created by a first subject (1) is detected and converted into a transmitted output signal presented to a second subject (7) in order to communicate information from the first subject (1) to the second subject (7). The invention further relates to rehabilitation of handicapped people.

9 Claims, 2 Drawing Sheets

COMMUNICATION METHOD AND APPARATUS

FIELD OF THE INVENTION

The present invention relates to a non-lingual communication method and apparatus, wherein a physical or physiological signal consciously created by a first subject is detected and converted into a transmitted output signal presented to a second subject in order to communicate information from the first subject to the second subject. The invention further relates to rehabilitation of handicapped or otherwise disabled people.

BACKGROUND OF THE INVENTION

It is well-known to use physical signals like movement of the whole body, for example by dancing, for electronic conversion into audio-visual signals. For example, U.S. Pat. No. 5,045,687 discloses an optical instrument capable of registering a person's movement in a defined space and converting the registered movement into musical tones and images. Also, measurement of physiological quantities as electromyographic (EMG) signals, galvanic skin response (GSR), electroencephalographic (EEG) signals, skin temperature, blood pressure, and heart rhythm (electrocardiography or ECG) have been used in biofeedback methods, where the subject is presented for a converted output signal indicative of the actual physiological state of the subject. Thereupon, the subject is able to change the output signal, for instance an audio-visual signal, as a response to a change in the physiological state. U.S. Pat. No. 5,662,117 discloses such a method and apparatus wherein the method is used to teach a person to relax even in a stressful situation. German Pat. No. DE 197 45 508 discloses a method and system where bio-electrical signals are converted to audio-visual signals presented for two persons that are competing in attaining the most relaxed state. U.S. Pat. No. 6,001,065 discloses a method and apparatus, where bio-electrical signals from a subject as a person, an animal, or a plant are used to control and interact with electronic media such as motion pictures, video games, virtual environments or security systems.

Though the prior art teaches measurements of physiological signals and conversion of these signals into an audio-visual signal, none of these references describes the use of physiological signals as a substitute for lingual communication between people. However, such a system would be a desirable tool for handicapped people who are unable to speak or to form words from letters as well as others who prefer non-verbal communication.

OBJECTS AND ADVANTAGES

It is an object of the invention to provide a method and an apparatus for non-lingual communication between people. Non-lingual in this context is to be understood as an exclusion of spoken or written words.

It is a further object of the invention to provide a method and apparatus wherein a subject's physical and physiological signals of different nature are detected by a detecting medium and converted into a variety of different output signals to be presented to a different subject in order to communicate information from one subject to another.

It is a further object of the invention to provide a method and apparatus wherein the sensitivity of the detecting medium is adjustable according to a predetermined map or is adjustable in an interactive process through an interactively learning computer including a neural network.

SUMMARY OF THE INVENTION

A method according to the invention comprising a number of steps, wherein the first step is selecting an input medium and an output medium from a group of selectable input and output media having electronic means.

A number of detection methods are available to sense physical or physiological signals or parameters. If the parameter to measure is movements of the subject, for example movement of the body or a limb, it is possible to register this movement by an arrangement where an emitted wave after reflection at the body or limb is detected by a suitable detector. The emitted wave is for example for example an electromagnetic wave like laser light, a sound wave, or an ultrasonic wave. Movements alter the conditions for the reflection, and the change of the amplitude and phase of the reflected wave can be related to the movement of the body or limb. Examples of applicable electromagnetic waves are infrared light and visible light including laser light.

If movements of the body are to be detected, another possible arrangement including a so-called dance-suit can be employed. The dance-suit is equipped with detectors that change signal upon bending of joints like elbow and knees.

Further, a number of physiological signals are measurable. An example is temperature of the skin of the subject's body, breath pressure, oximetry (measurement of oxygen content in the subject's blood), or tremor. Other examples are electrophysiological parameters as brain wave activity (encephalography or EEG), heart rhythm (electrocardiography or ECG), galvanic skin response (GSR), skin conductance (SC), or muscle tension (electromyography or EMG).

As an output media, a large number of possibilities exist. Traditionally, sound generators and image displays are most common. However, other media would be desirable as well, especially if the invention relates to rehabilitation of those handicapped people that are not able to see and hear. Other possible media are vibration generators, heating devices, and electrodes that directly excite certain nerves. Also possible as input and output devices are mechanical controllers for wheelchair movements.

A second step in the method is detecting by said input medium physical or physiological signals consciously created by a first subject indicative of information to be submitted to a second subject, wherein the term 'second subject' is to be understood generally and includes also a group of subjects.

Generally, in biofeedback processes according to prior art, an audio-visual signal changes in response to the change of the physiological condition of the subject. The altering of the audio-visual signal guides indicates to the subject, whether a progress towards a desired physiological state is attained. Thus, information is submitted to the subject as a feedback to learn to control physiological parameters.

The aim of the invention is different and takes a step beyond prior art. According to the invention, the change of the subject's physiological parameters themselves are used to express information. Thus, a handicapped who is not able to move or talk, may be able to learn to control some of his physiological parameters in such a way that they can be used for communication. It might even be possible that subjects with equal or with different handicaps learn to communicate with each other using different physiological parameters for expressing information to be communicated. In this light, the invention is a non-lingual communication method opening the possibility for severely handicapped people to communicate to the outside world in a way which has not been possible hitherto.

Once the signal from the subject has been sensed, for example an electrophysiological signal, this signal is converted to a transmittable signal. Usually, the detected electrophysiological signal is an analogue signal. In order to facilitate transmission of that signal, it is converted to a transmittable analogue signal or, preferably, a digital signal.

The format of the digital signal is compact to reduce the amount of data to be transmitted for thereby to increase the data transmission speed.

A fourth step is transmitting said transmittable signal, preferably digital data, to a data transformer, which is functionally connected to said output media. Digital data can be submitted without loss throughout the world by telephone lines, mobile telephone communication systems, broadcasting networks, or by the Internet, which is advantageous. A large and still increasing amount of the world's population has got access to the Internet, making this transmitter means a versatile tool for the communication related to this invention.

A fifth step is transforming said data to a sequence of output signals from said output media. The transmittable signal, preferably digital data, are after transmission transformed into a suitable format and transmitted to the output medium or media. How the transmittable signal is transformed is completely independent of the input media and only dependent on the output media. Different media require different formats. However, using digital data as the transmittable signal, where the format of the digital data itself is known, a transformer can be designed according to every special output medium.

A sixth step is presenting to said second subject said sequence of output signals for communicating said information from said first subject to said second subject. The output medium can be different to the input medium so that there is no limitation with respect to the form in which the signals are sent and received. For instance, it might be possible that the first subject communicates by GSR while the second subject receives this information from a heating device on the skin. On the other hand, the second subject might as an answer respond with an EEG signal which after conversion is received by the first subject as a vibration.

According to another embodiment of the invention, the method comprises calibration of the sensitivity of said input medium to correspond to a specific amplitude range for said physical or physiological signal wherein the calibration is performed according to a predetermined map, eventually including fuzzy logic.

The calibration may alternatively be performed by the first subject or the second subject, for example by interactive changing of the map. Electronic tools for this map may be stored in a computer or may be downloaded from the Internet. Not only the signalling from the first subject to and from the second subject is comprised in the non-lingual communication method according to the invention, but also the technical configuration including the calibration may be part of the communication, enabling the first and the second subject to optimise the system to the best possible communication form.

Detecting signals from the first subject may involve the problem to be solved in which the actual information is hidden in a minor part of the signal. Spastic movement of a handicapped person's limb may give a signal with a rather large amplitude. However, the actual information from the handicapped person may lie in a more sophisticated pattern of movements overlaying the spastic movement. Thus, the actual information would in this case be an overlay signal on top of the signal with the large amplitude. In this situation, it is necessary to teach the detector to filter the actual information from the non informative part of the signal. In other words, a calibration has to be performed in a more or less sophisticated way. How this calibration is made depends on a map, which can be predetermined according to known factors including thresholds or range comparisons or more sophisticated methods including complex logical algorithms and a plurality of control parameters.

According to another embodiment of the invention, the calibration is performed by an interactively learning computer including a neural network. Though learning computers, where neural networks are included, are scarcely used today, the fast development of computers will give access to this kind of tool within short time. Using this kind of computer in connection with the invention open a new way of calibration. Any man-made map is dependent on the person who initially programmed the map or the routines for the map creation. However, in case a learning computer is used in connection with the detection of the subject's signals, the computer may after some time of learning during the interaction with the subject find out the optimum calibration itself through the interaction with the subject. This may or may not involve a rather long time for the learning process of the computer, however, a computer in contrast to a third person is not limited by a decreasing enthusiasm due to missing results at first stage.

There are subjects that are handicapped in a way which basically excludes them from communication with other people. Through history there have been reported handicapped people that have been regarded as having almost no substantial brain function, while those people at a later stage recovered partly from their handicap and could communicate to the outside world that they in fact experienced their surrounding all the time but just were physically unable to communicate. By learning to utilise control over physiological parameters, this kind of handicapped people may even learn to program and interact with a learning computer through their own kind of information signals, whereby the learning computer can be used as an interface between the subject and the outside world.

In the widest range of applications, the invention can be utilised to form a communication bridge between subjects of different kind. A completely new kind of communication may be possible not only between human beings but also between animals, plants and humans. The learning process may be a long lasting experimental period, however, with help by learning computers including neural networks combined with the creative skills from humans, the time to learn this new way of communication will be substantially shorter than the time it took for human beings to create the first written language.

Though the invention aims at constituting a communication tool for different kind of subjects, preferably handicapped people in rehabilitation processes, the invention can be used in a wider sense for a number of other purposes as well. Thus, the invention also is usable as a playing tool, for example creation of audio-visual sequences by an input of physical or physiological signals. The invention is further applicable as a feedback mechanism for a person training his skills to control and change physical factors or physiological parameters. Furthermore, the invention may be an intermediate link between a subject and an apparatus, where the apparatus is controlled through physical or physiological signals. These applications are known from prior art in a very limited form. However, the versatility of the present invention allows a much wider range of physical or physiological aspects to be interrelated with a great variety of different output media.

The invention also embraces a non-lingual communication apparatus comprising an input medium and an output medium selected from a range of selectable input and output media having electronic means, said input medium operable to detect physical or physiological signals consciously created by a first subject indicative of information to be submitted to a second subject, a converter for converting said signals into a transmittable signal, preferably digital data, a transmitter for transmitting said transmittable signal, preferably digital data, from said converter to a data transformer which is functionally connected to said output medium, said data transformer transforming said transmittable signal, preferably digital data, into control commands for said output media, wherein said output medium generates sequence of output signals for communicating said information from said first subject to said second subject.

In a further embodiment of the invention the apparatus further comprises calibration means for calibration of the sensitivity of said input medium to correspond to a specific amplitude range for said physical or physiological signal wherein said calibration is performed according to a predetermined map or by an interactively learning computer including neural network.

Though the primary object of the invention is a non-lingual communication method and tool between subjects, the invention may also be used for
- distant therapy, where a clinician is able to instruct and monitor a patient through a communication link, as for example the Internet or wireless communications links, in this case, the invention may be combined with a camera to monitor changes and improvements during therapy,
- body language and personal interaction training, for example of corporate leaders or of schoolchildren in a pedagogic environment,
- spectator interactivity whereas the participants in an event can interact with the performers and/or other participants locally or at a distance,
- theatrical movement, where dance or musical actions are transmitted to another group locally or at a distance, for example through television,
- personal entertainment or recreation, whereas a subject or subjects can, for example through the Internet, interact with others through a user interface or game
- controlling hardware, where the detected signal is used with a suitable transformer to control technical and/or electronic commands for the control of an apparatus.

DESCRIPTION OF PREFERRED EMBODIMENT

Figure 1:
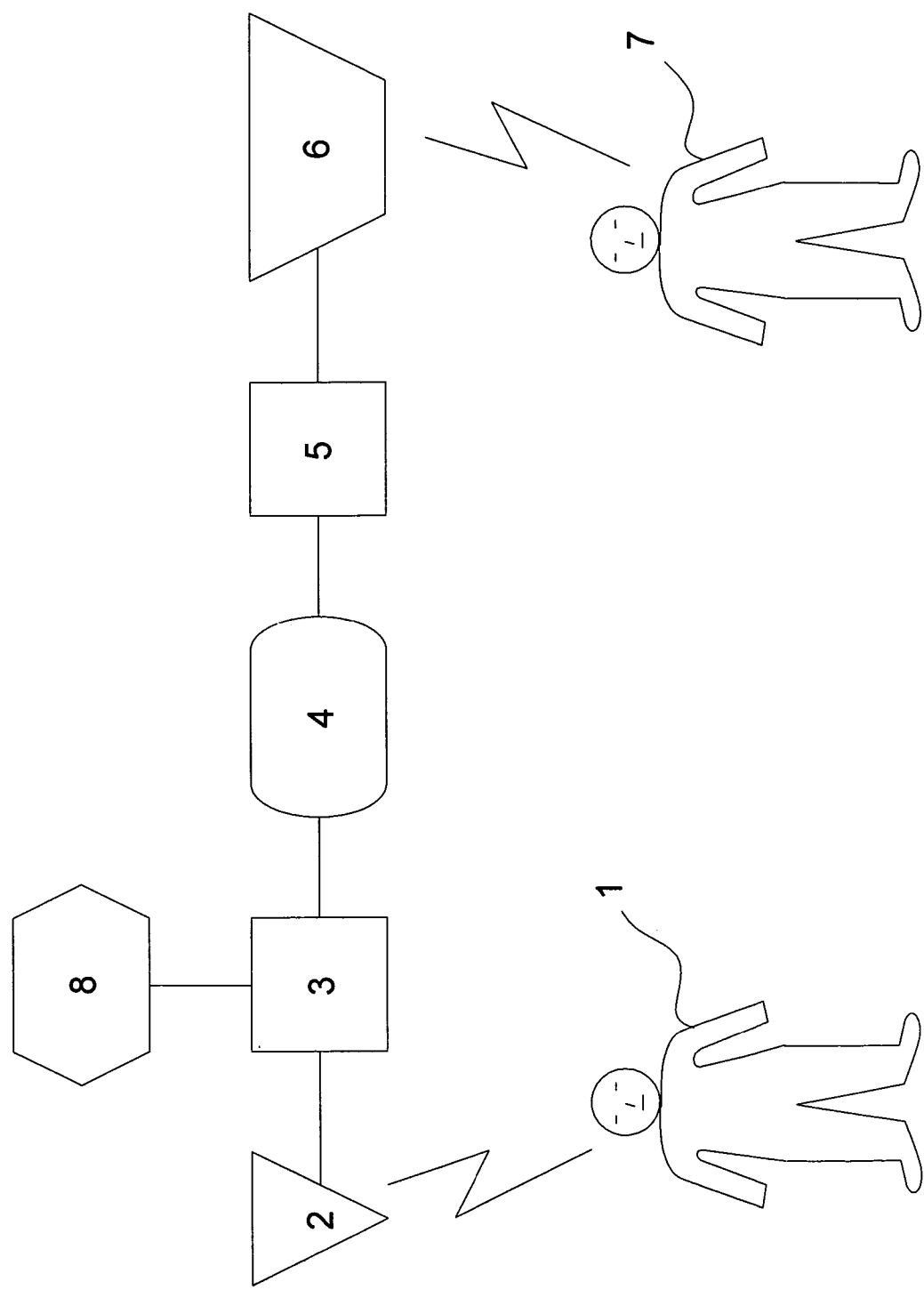
FIG. 1 shows the invention in a schematic way.

FIG. 1 describes the communication apparatus in a schematic way. An input medium 2 detects physical or physiological signals from a first subject 1. These signals are converted into digital data in a converter 3. The converter 3 is coupled to a computer 8, where the signals are analysed and evaluated. Digital data containing information of the signal from the first subject 1 are transmitted by a transmitter 4 to a transformer 5 coupled to an output medium 6. The digital data are transformed suitably by that transformer that the output medium 6 can present a signal to the second subject 7.

The input medium can be one or more detectors of like or different kind, for example a detector that detects movement of a limb or of the whole subject 1. The output medium can be one or more specific media, for example a sound generator. Thus, movements of a limb from the first subject 1 is transformed into a sound pattern, as for example music, to be presented to the second subject 7.

The first subject 1 could for example be a handicapped person and the second subject 7 could be a therapist or another handicapped person, family member or friend. The terms 'first subjects' and 'second subject' are to be understood generally in that the terms also cover groups of people or even animals or plants. The invention enables the first subject 1 to communicate with another subject 7 in a way that is adapted to his skills. The invention can be used both ways in that a likewise communication link is established from the second subject 7 to the first subject 1.

Once a signal from the first subject 1 is detected, the conversion of the signal into digital data in the converter 3 is controlled by a computer 8. The converter and the computer may be separate units, but may also be combined into one unit. The control may preferably include a calibration of the input medium 2 such that the signal of interest is detected in the most appropriate way.

Figure 2:
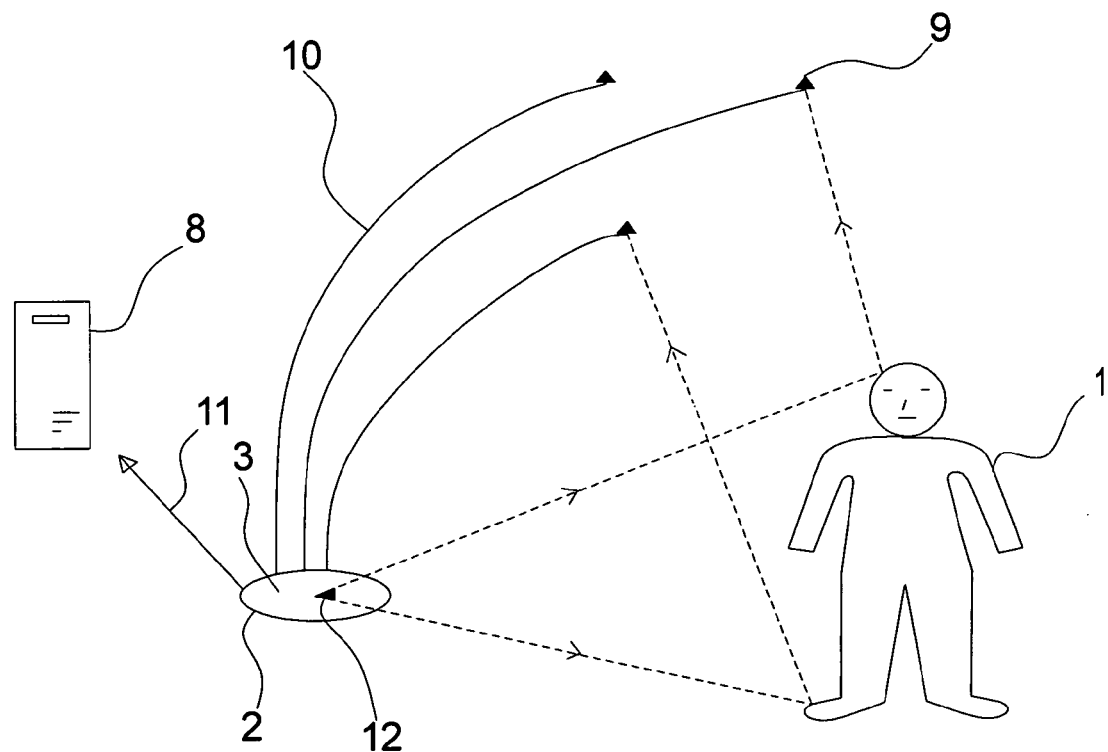
FIG. 2 shows a set of detectors comprised by an input medium used to detect movements.

FIG. 2 shows an infrared, or alternatively ultrasound, emitter 12 and detectors 9, preferably on goose neck mounts 10, which facilitates adjustment of the detectors according to the moving part of the first subject 1, for example an eye lid. Using infrared light as detecting radiation has the advantage that background light does not disturb the signal, as this can be filtered from the detected signal. By limiting the emission and detection of the radiation to a defined bandwidth, also background radiation in the infrared regime can be reduced in order to prevent informationless contributions to the information signal.

The emitter 12 and detectors 9 comprised by the input medium are preferred but not limited to the type as described by DeFranco et al. in U.S. Pat. No. 5,475,214. Infra-red light is emitted by the emitter 12, scattered by the first subject 1 and then detected by the detectors 9. In the detection of limbs moved by the first subject 1, the scattered signal from the limb is enhanced, if the limb is provided with a reflective cover layer, as for example described by Walter in U.S. Pat. No. 5,171,624 and by Nilsen in U.S. Pat. No. 5,780,140.

Only one detector is necessary for the invention, however, the number of detectors 9 is variable. For example, three detectors 9 can be used to detect the signal. These three detectors 9 can then be used to control the red, green and blue components of a colour synthesised image, for example. Alternatively, the three detectors 9 may control three different output instruments to form music. If more detectors 9 re used, further elements can be controlled like graphic shapes or rhythm. Each detector can be assigned to whichever parameter is required to control.

Opposite the detectors, the goose neck mounts 9 are preferably equipped with 3 pin XLR connectors to allow for multiple extension if necessary. However, the invention is not limited to this kind of mounts.

Once the infrared signal is detected, it is transferred to the converter, where the analogue signal is converted into digital data. The input signal is, for instance, an electric signal with a voltage between 0 and 5 V. This signal may be converted into to a digital signal with a range of 64 bit to ensure high dynamics. In the case of a sound generator as the output medium 6, the digital data alternatively may be of MIDI (Musical Instrument Digital Interface) kind. Spastic movement of a handicapped person's limb may give a signal with a rather large amplitude. However, the actual information from the handicapped person may lie in a more sophisticated pattern of movements overlaying the spastic movement. Thus, the actual information would in this case be an overlay signal on top of the signal with the large amplitude. In this situation, it is necessary to teach the detector to filter the actual information from the non informative part of the signal. In other words, a calibration has to be performed in a more or less sophisticated way.

In the most simple arrangement, this calibration may be performed manually. Alternatively, this calibration may be done in the computer after the signal conversion such that only a certain part of the full signal is transmitted to the transformer and used for communication to the second subject. However, the computer may control the calibration at the detector as well. The sensitivity of the detector may be adjusted to filter out parts of the signal. These calibration processes may be accomplished by predetermined algorithms according to a map.

However, the calibration may also be a process, where a computer is used which comprise neural networks and which is able to learn characteristics from the first subject 1 during the signalling process. These characteristics may be discovered by the computer by including intelligent frequency and amplitude analyses. For example, characteristics may be manifested by a changing frequency pattern with small amplitude on top of a rather large signal with a more or less constant or only slowly changing frequency. Using intelligent filters including Fourier analysis, the actual communicative information in the signal can be filtered from the total signal, even though the largest amplitude of the signal belongs to the non-informative part of the signal.

Between the converter 3 and the computer 8 data are transferred by a wired link or by a wireless data link 11, for example a telephone connection or a Bluetooth link. Between the converter and the transformer, the transmission may be accomplished by a variety of wired or wireless links including for example a telephone link, a television link, or the Internet.

The transformer 5 transforms the transmitted signal into a format suitable or the output medium 6, for example a sound generator. By this embodiment of the invention, the movement from the first subject 1 is transformed into a sound pattern presented to a second subject 6. In principle, the sound pattern may be presented to the first subject as a feed-back tool, eventually simultaneously with the presentation to the second subject 6.

What is claimed is:

1. A non-lingual communication method comprising the steps of:
   selecting at least one input medium from a group of selectable input media and at least one output medium from a group of selectable output media,
   detecting by said at least one input medium physical signals consciously created by a first subject indicative of intentional information to be submitted to a second subject,
   converting said signals into a transmittable signal,
   transmitting said transmittable signal into a data transformer, which is functionally connected to said at least one output medium,
   transforming said transmittable signal to a sequence of output signals to be outputted from said at least one output medium,
   presenting to said second subject said sequence of output signals for communicating said intentional information from said first subject to said second subject,
   and calibrating the sensitivity of said at least one input medium to correspond to a specific amplitude range for said physical signals wherein said calibration step is performed according to a predetermined map;
   wherein said at least one input medium is selected from the group consisting of
      an electromagnetic radiation emitter and an electromagnetic radiation detector for detecting movements,
      a sound wave emitter and a reflected sound wave detector for detecting movements,
      a laser scanner and a light detector for detecting movements,
      means for motion detection;
   and said at least one output medium is selected from the group consisting of
      a sound generator,
      an image display,
      a vibration generator,
      a light pulse emitter,
      a heating device,
      a nerve exciting electrode, and
      a motor driven device.

2. The method of claim 1 wherein said transmittable signal comprises digital data.

3. The method of claim 1 wherein at least one of first and second subjects is a handicapped person.

4. The method of claim 1 wherein the input medium physical signals further comprise movements.

5. The method of claim 1 wherein said calibrating step is performed by an interactively learning computer including a neural network.

6. A non-lingual communication apparatus comprising:
   at least one input medium and at least one output medium selected from a group of selectable input and output media, said at least one input medium operable to detect physical signals consciously created by a first subject indicative of intentional information to be submitted to a second subject,
   a converter for converting said signals into a transmittable signal,
   a transmitter for transmitting said transmittable signal from said converter to a data transformer which is functionally connected to said at least one output medium, said data transformer transforming said transmittable signal into control commands for said at least one output medium, wherein said at least one output medium generates a sequence of output signals for communicating said intentional information from said first subject to said second subject, and
   calibration means for calibration of the sensitivity of said at least one input medium to correspond to a specific amplitude range for said physical signals wherein said calibration is performed according to a predetermined map;
   wherein said at least one input medium is selected from the group consisting of
      an electromagnetic radiation emitter and an electromagnetic radiation detector for detecting movements,
      a sound wave emitter and a reflected sound wave detector for detecting movements, a laser scanner and a light detector for detecting movements, and
means for motion detection;
and said at least one output medium is selected from the group consisting of
a sound generator,
an image display,
a vibration generator,
a light pulse emitter,
a heating device,
a nerve exciting electrode, and
a motor driven device.

7. The apparatus of claim 6 further comprising calibration means for calibration of the sensitivity of said at least one input medium to correspond to a specific amplitude range for said physical signals, wherein said calibration is performed by an interactively learning computer including neural network.

8. The apparatus of claim 6 wherein said transmittable signal comprises digital data.

9. The apparatus of claim 6 wherein the input medium physical signals further comprise movements.

* * * * *